United States Patent
Grosse

(10) Patent No.: US 10,029,895 B2
(45) Date of Patent: Jul. 24, 2018

(54) ARRANGEMENT AND METHOD FOR OPERATING A STORAGE AND RETRIEVAL UNIT

(71) Applicant: TGW Mechanics GmbH, Wels (AT)

(72) Inventor: Eric Grosse, Langen (DE)

(73) Assignee: TGW Mechanics GmbH, Wels (AT)

( * ) Notice: Subject to any disclaimer, the term of this patent is extended or adjusted under 35 U.S.C. 154(b) by 537 days.

(21) Appl. No.: 14/780,071

(22) PCT Filed: Mar. 25, 2014

(86) PCT No.: PCT/AT2014/050073
§ 371 (c)(1),
(2) Date: Sep. 25, 2015

(87) PCT Pub. No.: WO2014/153584
PCT Pub. Date: Oct. 2, 2014

(65) Prior Publication Data
US 2016/0031687 A1   Feb. 4, 2016

(30) Foreign Application Priority Data
Mar. 27, 2013   (AT) .................................. 50211/2013

(51) Int. Cl.
*B60L 9/02* (2006.01)
*B66F 9/07* (2006.01)
*B60L 9/16* (2006.01)

(52) U.S. Cl.
CPC .................................. *B66F 9/07* (2013.01); *B60L 9/02* (2013.01); *B60L 9/16* (2013.01)

(58) Field of Classification Search
CPC ................. B66F 9/07; B60L 9/02; B60L 9/16
See application file for complete search history.

(56) References Cited

U.S. PATENT DOCUMENTS

| 4,892,980 A | 1/1990 | Riley |
| 5,629,674 A | 5/1997 | Fahrion |
| (Continued) | | |

FOREIGN PATENT DOCUMENTS

| DE | 38 37 054 A | 6/1989 |
| DE | 39 19 167 C1 | 9/1990 |
| (Continued) | | |

OTHER PUBLICATIONS

International Search Report of PCT/AT2014/050073, dated Jul. 2, 2014.

Primary Examiner — Robert Deberadinis
(74) Attorney, Agent, or Firm — Collard & Roe, P.C.

(57) ABSTRACT

A method and an arrangement for operating a storage and retrieval unit (3) are specified. A rail line (1) respectively a power supply rail (6) for the storage and retrieval unit (3) is set to a risk mode voltage, the rectified value/effective value of which lies below a minimum rectified value/minimum effective value necessary to move the storage and retrieval unit (3) but above zero, if a risk posed by the storage and retrieval unit (3) is detected. Alternatively or in addition, the voltage applied to the rail line (1)/power supply rail (6) can also be investigated in the storage and retrieval unit (3) for modulated change signals. The applied voltage is passed on to a traction motor (5) of the storage and retrieval unit (3) only when it has been established that the normal operation-traction voltage and not the risk mode voltage has been applied to the rail line (1)/power supply rail (6).

13 Claims, 5 Drawing Sheets

(56) References Cited

U.S. PATENT DOCUMENTS

| | | |
|---|---|---|
| 8,842,985 B2 | 9/2014 | Hino et al. |
| 2012/0185080 A1 | 7/2012 | Cyrulik et al. |

FOREIGN PATENT DOCUMENTS

| | | |
|---|---|---|
| DE | 39 15 681 A1 | 11/1990 |
| DE | 41 12 728 A1 | 10/1992 |
| DE | 94 06 663 U1 | 6/1994 |
| DE | 196 28 123 A1 | 1/1998 |
| WO | 20121002431 A1 | 1/2012 | ns
ARRANGEMENT AND METHOD FOR OPERATING A STORAGE AND RETRIEVAL UNIT

CROSS REFERENCE TO RELATED APPLICATIONS

This application is the National Stage of PCT/AT2014/050073 filed on Mar. 25, 2014, which claims priority under 35 U.S.C. § 119 of Austrian Application No. A 50211/2013 filed on Mar. 27, 2013, the disclosure of which is incorporated by reference. The international application under PCT article 21(2) was not published in English.

The invention relates to an arrangement comprising a rail line, at least one racking row disposed alongside the rail line, a storage and retrieval unit which can be moved on the rail and a power supply and/or a power supply rail electrically connected to the rail line which is in contact with the storage and retrieval unit. The invention further relates to a method of operating said arrangement, specifically for operating a storage and retrieval unit which can be moved on a rail line and is supplied by a power supply and/or a power supply rail electrically connected to the rail line, by means of which at least one racking row disposed alongside the rail line can be accessed.

Such an arrangement and such a method are known in principle from the prior art. For example, said rail line is disposed in a racking aisle between two racking rows so that the storage and retrieval unit can service racking shelves to the left and right of the rail line, in other words deposit objects in the shelf or retrieve objects from it. Several racking rows and rail lines may naturally also be disposed one above the other to create a storage system with several levels. A vertical conveyor may be provided at the front end of the shelves, i.e. at the end of a rail line. A horizontal conveyor (e.g. conveyor belt or conveyor rollers) may also be provided at the end of a rail line or on the vertical conveyor as well as a picking station, for example.

Although such storage systems are usually operated on a fully automated basis via a central control computer, it is necessary for an operator to enter a storage aisle from time to time, for example to carry out maintenance work on the storage and retrieval unit, the rail line or on the shelf itself, and also to remove objects which have become jammed during handling by the storage and retrieval unit. Since the storage and retrieval units reach high speeds and are also relatively heavy, special safety precautions need to be taken to protect the operator when moving in the racking aisle and approaching the rail line in front of the storage and retrieval unit.

To this end, DE 39 15 681 A1 discloses an arrangement whereby a photoelectric sensor is used to detect when a person enters the racking aisle. This enables a horn to be sounded or a signal lamp or barrier to be activated.

US 2012/0185080 A1 also discloses gates or barriers to prevent a storage and retrieval unit from entering a secured area of the racking aisle.

DE 196 28 123 A1 also discloses a system for detecting a person in or in the vicinity of a racking aisle by means of photoelectric sensors, for example. In the event of a situation posing a risk, the storage and retrieval units are controlled so that they operate in a slow creeping motion or are even brought to a halt.

Other prior art documents addressing this subject are DE 39 19 167 C1 and DE 41 12 728 A1.

The disadvantage of the known methods is that more or less singular precautions are taken but these are not based on a concept whereby the storage and retrieval unit can be effectively prevented from moving in a situation of risk, even though a minimum power supply thereof is maintained.

Accordingly, it is an objective of the invention to propose an improved arrangement and an improved method of operating a storage and retrieval unit. In particular, the intention is to effectively prevent the storage and retrieval unit from moving in the event of a dangerous situation whilst nevertheless ensuring that it has a minimum power supply.

The objective is achieved by the invention on the basis of a method of the type outlined above, whereby the rail line/power supply rail is set to a risk mode voltage, the rectified value/effective value of which lies below a minimum rectified value/minimum effective value necessary to move the storage and retrieval unit but above zero, if a risk posed by the storage and retrieval unit is detected.

The objective of the invention is also achieved by means of a method of the type outlined above, whereby
   during normal operation, the rail line/power supply rail is set to a traction voltage if it is detected that the storage and retrieval unit does not pose a risk and to a risk mode voltage if it is detected that the storage and retrieval unit does pose a risk, and
   the voltage applied to the rail line/power supply rail can be investigated in the storage and retrieval unit for the presence of a predefined characteristic and said voltage is only passed on to a traction motor of the storage and retrieval unit if it has been established that the characteristic indicates the presence of the traction voltage, and in terms of characteristics
a) the traction voltage contains a predefined first change signal (first pilot signal) and the risk mode voltage does not contain this first change signal or
b) the risk mode voltage contains a predefined first change signal (first pilot signal) and the traction voltage does not contain this first change signal or
c) the traction voltage contains a predefined first change signal (first pilot signal) and the risk mode voltage contains a predefined second change signal (second pilot signal).

In this instance too, the rectified value/effective value of the risk mode voltage may preferably lie below a minimum rectified value/minimum effective value necessary to move the storage and retrieval unit but above zero.

The objective of the invention is also achieved by means of an arrangement of the type outlined above comprising a drive control system configured to set the rail line/power supply rail to a risk mode voltage, the rectified value/effective value of which lies below a minimum rectified value/minimum effective value necessary to move the storage and retrieval unit but above zero, when a risk posed by the storage and retrieval unit is detected.

Finally, the objective of the invention is also achieved by means of an arrangement of the type outlined above, further comprising
   a drive control system configured to detect a risk posed by the storage and retrieval unit and in normal operation when there is no risk to set the rail line/power supply rail to a traction voltage and in the event of a risk to a risk mode voltage, and
   a motor controller in the storage and retrieval unit configured to investigate the voltage applied to the rail line/power supply rail in the storage and retrieval unit for the presence of a predefined characteristic and pass said voltage to a traction motor of the storage and retrieval unit only if the detected characteristic indicates the presence of the traction voltage, and in terms of characteristics a) the traction voltage contains a predefined first change signal (first pilot signal) and the risk mode voltage does not contain this first change signal or b) the risk mode voltage contains a predefined first change signal (first pilot signal) and the traction voltage does not contain this first change signal or c) the traction voltage contains a predefined first change signal (first pilot signal) and the risk mode voltage contains a predefined second change signal (second pilot signal).

As a result of the proposed features, it is possible to supply the storage and retrieval unit (also known as a shuttle in the case of a single-level rack servicing device) with electrical energy, even in the event of a risk, for example in order to keep important electronic components in operation without back-up capacitors or back-up batteries, even in the event of a risk. For example, this can be achieved by a communication module or a position encoder of the storage and retrieval unit so that normal operation can be resumed without problem following risk mode operation. Another advantage is that analyzing a fault and removing a fault on the supplied storage and retrieval unit is made easier. For example, error codes can be displayed on the storage and retrieval unit and setting of sensors is also made easier, for example, due to the fact that the power supply is maintained.

In spite of the fact that the power supply of the storage and retrieval unit is guaranteed even in the event of a risk, the implemented measures guarantee that a person present on the rail line is effectively protected. Especially if the rectified value/effective value of the risk mode voltage lies below a minimum rectified value/minimum effective value necessary to move the storage and retrieval unit, any movement of the storage and retrieval unit can be ruled out for physical reasons alone. In other words, too little power is forwarded to the traction motor of the storage and retrieval unit for the storage and retrieval unit to be able to move. Personnel protection is therefore particularly effective.

The "effective value" is calculated by squaring and then determining a mean value and the "rectified value" is obtained by rectification and then determining a mean value. In the case of unipolar voltages, the "rectified value" therefore simultaneously corresponds to the (arithmetic) "mean value".

The term "move" in the context of the invention primarily refers to the movement of the entire storage and retrieval, unit, i.e. a travelling movement thereof on the rail line. However, "moving" can also refer to part areas of the storage and retrieval unit, for example to the extending and retracting movements and general movements of a lifting fork. Depending on the inertia of the moved unit and its driving power, different minimum rectified values/minimum effective values may be applied. It should also be noted that the drive need not necessarily be electrically operated and the electric power described above may be converted into another form, for example to pneumatic or hydraulic energy.

Other advantageous embodiments and features are defined in the dependent claims as well as the description of the drawings.

It is of advantage if the maximum value of the risk mode voltage in terms of amount lies below the minimum traction voltage. This offers even higher safety during operation of the storage and retrieval unit.

It is of advantage if the risk mode voltage is applied with the same polarity as the minimum traction voltage applied to the rail line/power supply rail. This means that special circuit features in the storage and retrieval unit can be dispensed with, such as the provision of a rectifier, for example. The motor controller can therefore be kept to a simple design.

However, it is also of advantage if the risk mode voltage is applied to the rail line/power supply rail with a polarity opposite the polarity of the minimum traction voltage. If the storage and retrieval unit is wired accordingly to prevent the risk mode voltage of opposite polarity from being forwarded to the motor, the risk mode voltage may be at any level. This means that in risk mode operation, components requiring a relatively high voltage can also be supplied, in particular a voltage which on average lies above the minimum traction voltage necessary to move the storage and retrieval unit. Electric power storage means (e.g. accumulators or capacitors) may optionally be provided in the storage and retrieval unit in order to bridge the time needed to reverse the polarity of the voltage.

It is of practical advantage if the risk mode voltage essentially has only a direct component, that is to say is essentially provided as direct voltage. This means that the drive control system can be kept particularly simple and robust. Outages and faults thereof can therefore be largely avoided.

It is also of practical advantage if the risk mode voltage essentially has only an alternating component. Especially if using a dc motor and a sufficiently high frequency of the risk mode voltage compared with the inertia of the storage and retrieval unit, a movement of the storage and retrieval unit can be prevented even without special circuit features in the storage and retrieval unit. This is because on average, the risk mode voltage in this instance does not have a direct component that would be necessary to move a dc motor.

It is also of practical advantage if the risk mode voltage has a direct component and an alternating component. This enables a part thereof to be used as a control signal. For example, the change signal contained in the risk mode voltage can be used as a control signal for the storage and retrieval unit. However, it would also be conceivable to use the direct component for this purpose.

In addition, it is also of advantage if said change signal is sinusoidal or in the form of a digital signal. A sinusoidal change signal can be coupled into the traction voltage particularly easily and coupled out of it. By way of example, a transformer or filter may be provided in the storage and retrieval unit for this purpose. With the aid of a digital signal, complex control commands can also be transmitted to the storage and retrieval unit. Furthermore, it is generally insensitive to interference. For example, the frequency hopping method or the spread spectrum method may be used for this purpose and control commands can be transmitted with a high degree of data security.

Finally, it is of advantage if an alternating voltage component in the storage and retrieval unit coupled out of the traction voltage (e.g. the entire alternating component or a specific frequency component thereof) is forwarded to the control coil of a relay and holds it in a switched state and the relay is configured to disconnect the traction voltage from the traction motor. In particular, the alternating component can be coupled out via a transformer and/or a filter and then rectified if necessary. Depending on whether the traction voltage applied to the storage and retrieval unit has an alternating component (in particular with a specific frequency) or not, the relay can be opened or closed and activation of the motor can be controlled in this manner. It is of particular advantage if this feature is used as an additional feature in conjunction with other safety measures.

At this stage, it should be pointed out that the different embodiments of the operating method proposed by the invention that are described here as well as the resultant advantages equally apply to the arrangement proposed by the invention and vice versa.

To provide a clearer understanding, the invention will be described in more detail below with reference to the appended drawings. Of these:

FIG. 1 is an exemplary and schematically illustrated racking arrangement with a storage and retrieval unit moving in between;

Figure 1:
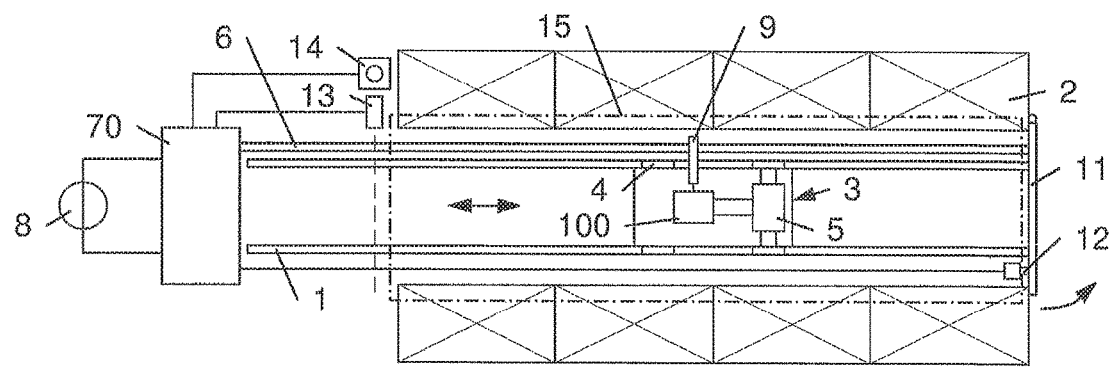

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 illustrates an arrangement with a rail line 1, at least one racking row 2 disposed alongside the rail line 1 and a storage and retrieval unit 3 which is able to move on the rail line 1. To this end, the storage and retrieval unit 3 has wheels 4 and a drive motor 5. The arrangement further comprises a power supply rail 6 and a drive control system 70 electrically connected to it, which is in turn connected to a power supply/voltage source 8. In the example illustrated, the supply voltage is picked up from the power supply rail 6 via a sliding contact 9 and forwarded to a motor controller 100 which activates the drive motor 5 and which is also capable of handling other control tasks, for example depositing and retrieving storage containers in or from the shelf 2. In FIG. 1, the power supply rail 6 is disposed next to the rail line 1, although the power supply rail 6 may naturally also be disposed inside the rail line 1. The right-hand end of the racking aisle in this example is closed off by a door 11, the closure status of which is monitored by a switch 12 connected to the drive control system 70. Finally, by way of example, the illustrated arrangement further comprises a photoelectric barrier 13 as well as a push-button switch 14 which are connected to the drive control system 70.

The arrangement illustrated in FIG. 1 operates in the following manner.

During normal operation, the storage and retrieval unit 3 receives commands from a master controller, not illustrated, to pick up objects from a transfer station and deposit them in the shelving or to retrieve objects therefrom and take them to the transfer station. Transfer stations may be provided respectively at the ends of the rail line 1. A vertical conveyor device may also be provided there so that several rail lines 1 may be disposed one above the other, thereby forming a storage system with several levels. It would also be conceivable to provide a horizontal conveyor device (e.g. conveyor belts or conveyor rollers) respectively on the vertical conveyor device at the transfer station to enable the objects to be brought in and out accordingly. It would also be conceivable for a picking work station to be provided respectively on the vertical conveyor device at the transfer station.

During normal operation, the storage and retrieval unit 3 operates on a fully automated basis. In specific situations, however, it may be necessary for an operator to intervene, for example if objects become wedged, the storage and retrieval unit 3 is faulty or the conveyor flow is disrupted in some other way. Since the storage and retrieval unit 3 moves at a relatively high speed, the operator must be protected when walking in the racking aisle or by the rail line 1. To this end, the operator depresses the push-button switch 14, whereupon the storage and retrieval unit 3 is brought to a halt. In addition, the entrance to the racking aisle is also monitored by the photoelectric barrier 13. For additional protection, the door 11 is provided at the right-hand end of the racking aisle, which is monitored by means of the switch 12. This results in a protected zone 15. In addition, protective fencing may be provided around the shelves 2.

If a person is detected entering the racking aisle, be it from the left or right, the storage and retrieval unit 3 is brought to a halt automatically, i.e. without the push-button switch 14 having to be explicitly depressed for this purpose. In FIG. 1, both ends of the racking aisle are monitored. Naturally, it would also be possible to equip just one of the ends of the racking aisle with a photoelectric barrier 13 and/or a push-button switch 14 and/or a door 11 with a switch 12. As an alternative or in addition, it would also be conceivable to provide other safety features, for example by operating barriers or monitoring by other sensors, for example proximity sensors or video cameras.

The drive control system 70 then sets the rail line 1/power supply rail 6 to a risk mode voltage, the rectified value/effective value of which lies below a minimum rectified value/minimum effective value necessary to move the storage and retrieval unit 3 but above zero, if a risk posed by the storage and retrieval unit 3 is detected, i.e. if the push-button switch 14 is depressed or the photoelectric barrier 13 or switch 12 indicates that the racking aisle is being entered. In this manner, an electronic control system of the storage and retrieval unit 3, for example the drive control system, can advantageously continue to be supplied with power, although the storage and retrieval unit 3 is not able to move due to the low voltage. In this respect, the voltage level may be selected so that it lies below the starting voltage so that the stationary storage and retrieval unit 3 can no longer move off or it may even be below the traction voltage, in which case a moving storage and retrieval unit 3 is brought to a halt. For example, the voltage during normal operation may lie at less than 100V and in particular at 70V, 24V or 48V, whereas the risk mode voltage may be, for example, less than 24V and in particular 5V or 12V, which is usually sufficient for supplying electronic components. It would also be conceivable for only important circuits to be designed to run on risk mode voltage whilst other circuits, including the motor 5, are switched off. For example, it may be that position encoders and communication modules continue to operate without restriction even when only the risk mode voltage is applied to guarantee seamless resumption of normal operation following risk mode operation.

Due to the inertia of the storage and retrieval unit 3, it is usually sufficient if the rectified value/effective value of the risk mode voltage lies below a rectified value/effective value of the traction voltage necessary to move the storage and retrieval unit 3. For even greater safety, however, it may be that the maximum value of the risk mode voltage is at a level below the minimum traction voltage.

Figure 2:
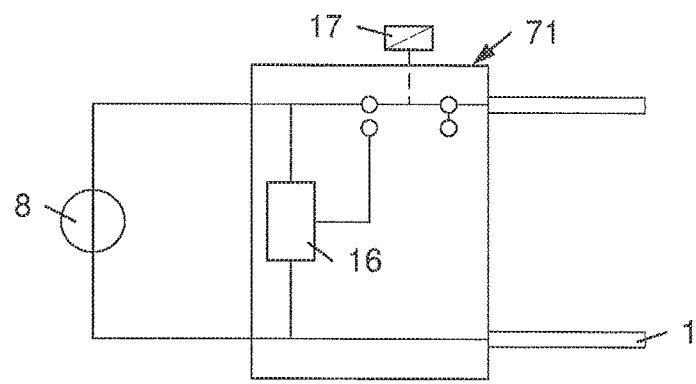
FIG. 2 is an exemplary and schematically illustrated drive control system for reducing the traction voltage in the event of a risk.

FIG. 2 illustrates a specific example of a drive control system 71 comprising a voltage converter 16 and a change-over switch 17. The voltage converter 16 converts the voltage supplied by the power supply/voltage source 8 to a lower level, for example from 70V to 24V. With the aid of the change-over switch 17, the voltage supplied by the voltage source 8 can be switched directly to the power supply rail 6 (see illustrated status) or it is switched to the lower voltage level.

In the example illustrated in FIG. 2, the risk mode voltage has the same polarity as the minimum traction voltage. However, it would also be conceivable for the risk mode voltage to be applied to the power supply rail 6 with a polarity opposite the polarity of the minimum traction voltage.

Figure 3:
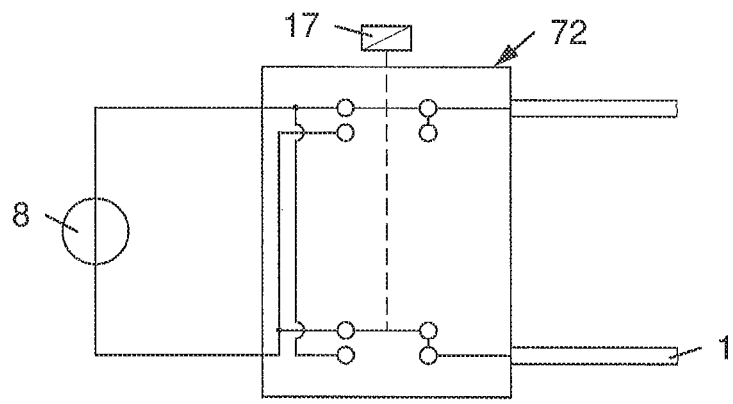
FIG. 3 is an exemplary and schematically illustrated drive control system for reversing the polarity of the traction voltage in the event of a risk.

In this connection, FIG. 3 illustrates an example of a drive control system 72, by means of which the voltage supplied by the voltage source 8 can be switched directly to the power supply rail 6 but in a different polarity depending on the position of the change-over switch 17. In order to achieve the desired objective, namely bring the storage and retrieval unit 3 to a halt but nevertheless continue to supply important components with power, the circuit illustrated in FIG. 4 may be provided in the storage and retrieval unit 3.

Figure 4:
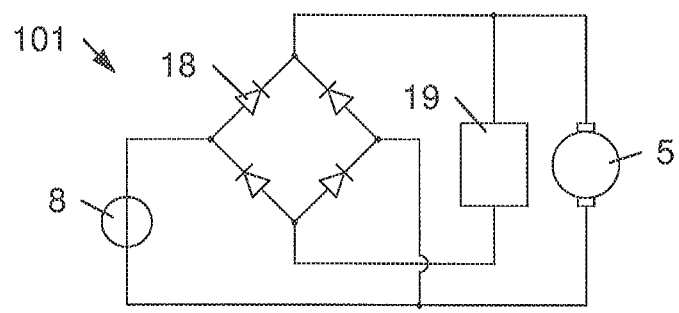
FIG. 4 is an exemplary and schematically illustrated motor controller for operating the storage and retrieval unit with risk mode voltage of opposite polarity.

FIG. 4 illustrates an example of a motor controller 101, the motor 5 being connected via a diode 18 to the voltage source 8. However, the diode 18 is also part of a full-wave bridge rectifier which supplies the circuit 19. The circuit 19 may contain important components, such as a position encoder and communication modules, for example. During normal operation (see the switch position of the change-over switch 17 illustrated in FIG. 3) the diode 18 is conducting and the motor 5 is supplied with current. The circuit 19 is also supplied with current via the rectifier. If the polarity of the voltage on the power supply rail 6 is reversed, the diode 18 is locked so that the motor 5 is no longer supplied with current. However, due to the rectifier, the circuit 19 is still supplied with electrical energy even if the polarity of the voltage is reversed. FIG. 4 is merely intended to illustrate the underlying principle. Naturally, it would be possible to provide another change-over switch for the motor 5 after the diode 18, by means of which the direction of rotation of the motor 5 can be reversed when the diode 18 is conducting.

Based on the combinations illustrated in FIGS. 3 and 4, the risk mode voltage may be applied as a direct voltage (i.e. essentially having only a direct component) and the direct voltage is applied with a different polarity respectively to the power supply rail 6.

However, it would also be conceivable for the traction voltage to be a direct voltage during normal operation and the risk mode voltage essentially has only an alternating component, i.e. is an alternating voltage. Again in this case, the circuit 19 would be supplied with electrical energy in both situations, whereas the motor 5 is only supplied with electrical energy with every second half-wave of the alternating voltage. On average, the voltage therefore drops to a lower value. It would also be conceivable to connect the motor 5 directly to the voltage source 8, i.e. without the diode 18 connected in between, in which case it must necessarily be a direct voltage motor. Due to the fact that the risk mode voltage does not essentially have a direct component, the motor 5 will simply stop at a sufficiently high frequency of the risk mode voltage due to its inertia, whereas circuit 19 will continue to be supplied with electrical energy.

Finally, it would also be conceivable to integrate an additional fuse in the drive control system 72 in the path for the risk mode voltage, which is designed to operate with the current for supplying the storage and retrieval unit 3 in the event of a risk but not for the motor current of the motor 5. This will prevent the storage and retrieval unit 3 from being set in motion if the diode 18 breaks down and becomes conductive. If this situation were to arise, the above-mentioned fuse in the drive control system 72 would kick in and prevent any movement of the storage and retrieval unit 3.

Another possible way of making the racking aisle safe is as follows:
  during normal operation, the power supply rail 6 is set to a traction voltage if it is detected that the storage and retrieval unit 3 poses no risk, and is set to a risk mode voltage if a risk posed by the storage and retrieval unit 3 is detected, and
  the voltage applied to the power supply rail 6 is investigated in the storage and retrieval unit 3 for the presence of a predefined characteristic and said voltage is forwarded to a traction motor 5 of the storage and retrieval unit 3 only if the detected characteristic indicates the presence of the traction voltage, and in terms of characteristics
a) the traction voltage contains a predefined first change signal (first pilot signal) and the risk mode voltage does not contain this first change signal or
b) the risk mode voltage contains a predefined first change signal (first pilot signal) and the traction voltage does not contain this first change signal or
c) the traction voltage contains a predefined first change signal (first pilot signal) and the risk mode voltage contains a predefined second change signal (second pilot signal).

Figure 5:
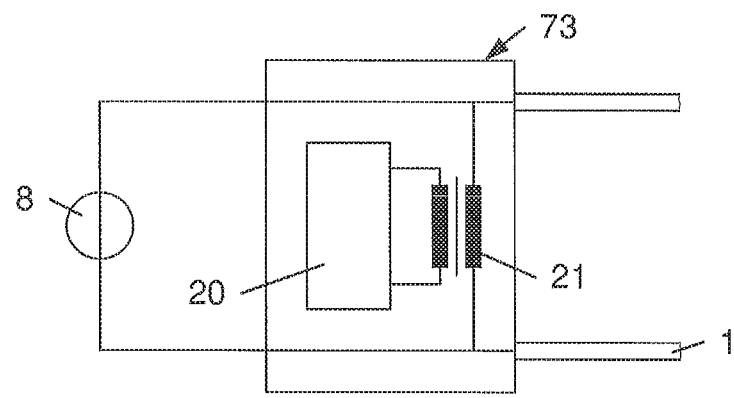
FIG. 5 is an exemplary and schematically illustrated drive control system for modulating a change signal on the traction voltage.
Figure 6:
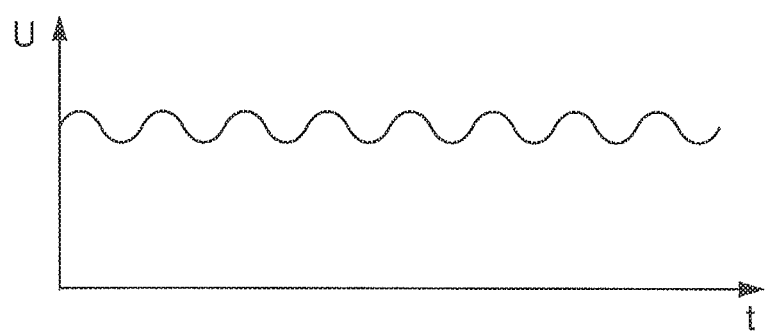
FIG. 6 is an exemplary traction voltage with a direct component and a sinusoidal alternating component.
Figure 7:
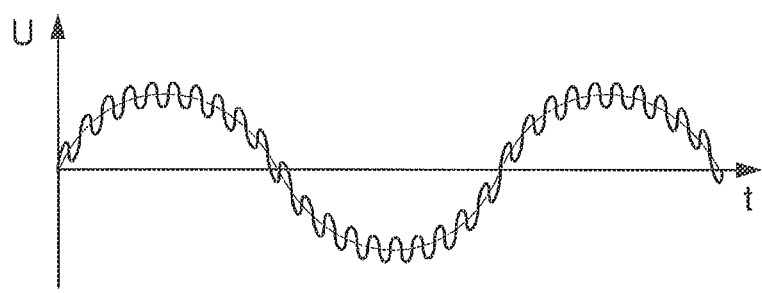
FIG. 7 is an exemplary traction voltage without a direct component and with a sinusoidal alternating component modulated on a sinusoidal fundamental wave.
Figure 8:
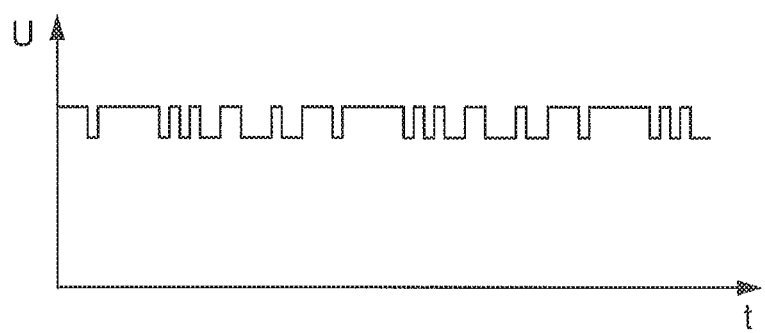
FIG. 8 is an exemplary traction voltage with a direct component and modulated digital signal.

In this connection, FIG. 5 illustrates an example of a drive control system 73, by means of which a modulator 20 and a coupling transformer 21 can be used to modulate a signal onto the voltage of the voltage source 8. For example, the modulator 20 can generate a sinusoidal signal which can be modulated onto a direct voltage supplied by the voltage source 8 with the aid of the coupling transformer 21. In this connection, FIG. 6 illustrates an example of the resultant voltage. It would also be conceivable for the voltage source 8 to supply an alternating voltage onto which an alternating voltage with a higher frequency is modulated. FIG. 7 illustrates an example of the resultant voltage in this situation. It would also be conceivable for the modulator 20 to generate a digital code which is modulated onto a direct voltage supplied by the voltage source 8. FIG. 8 illustrates an example of the resultant voltage in this situation. In a way similar to that illustrated in FIG. 7, it would also be conceivable to modulate the digital signal onto an alternating voltage.

In the examples illustrated, the modulated sinusoidal signal has a constant frequency and a constant amplitude. Naturally, this is not necessarily the case. It would also be conceivable for the frequency and/or amplitude of the modulated sinusoidal signal to be variable, i.e. the sinusoidal signal is frequency- and/or amplitude-modulated. Furthermore, signals can also be generally superimposed on a unipolar or bipolar basis, i.e. starting from a fundamental voltage may have only one polarity or may have both.

Figure 9:
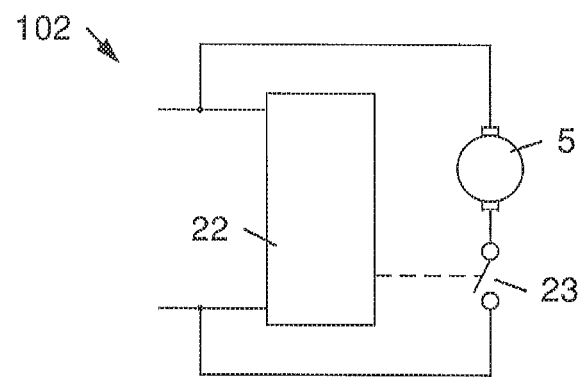
FIG. 9 is an exemplary and schematically illustrated motor controller for decoding a modulated change signal and FIG. 10 is an exemplary and schematically illustrated motor controller, whereby a relay in the motor circuit is held in a switched state by an alternating component in the traction voltage.

These components contained in the supply voltage for the storage and retrieval unit 3 can then be used to bring the storage and retrieval unit 3 to a halt in the event of a risk. FIG. 9 illustrates an example of this in the case of a motor controller 102 which comprises a decoder 22 and a switch 23 in a motor power circuit activated by the decoder 22.

Based on a first example, it is assumed that the traction voltage contains the predefined digital signal illustrated in FIG. 8 but the risk mode voltage does not contain this first digital signal (case a). This means that the drive control system 73 modulates the digital signal on the supply only in the absence of a risk. Accordingly, the decoder 22 holds the switch 23 closed as long as it is able to detect the agreed digital signal in the supply voltage. If it is no longer able to detect it, the storage and retrieval unit 3 is posing a risk and the switch 23 is opened as a result.

However, it would also be conceivable for the risk mode voltage to contain the predefined digital signal and the traction voltage does not contain this digital signal (case b). The risk mode voltage therefore has a direct component and an alternating component. In this case, the conditions outlined above are the reverse so that the switch 23 remains open as long as the decoder 22 is able to detect the agreed digital signal in the supply voltage.

Finally, it would also be conceivable for the traction voltage to contain a predefined first digital signal and the risk mode voltage to contain a predefined second, different digital signal. In this case, the switch 23 remains open as long as the decoder 22 is able to detect the agreed second digital signal in the supply voltage. If, on the other hand, the decoder 22 detects the first digital signal in the supply voltage, the switch 23 will be closed.

Naturally, for the safety system described above, it need not necessarily be that a digital signal is modulated and instead sinusoidal change signals may also be modulated (see FIGS. 6 and 7). These can be detected by means of a digital circuit, but an active or passive filter may also be provided as a decoder 22 or these may be contained in the decoder 22.

For the purpose of the invention, it is generally speaking not necessary for the change signal to be constantly modulated or constantly monitored during normal operation or in risk mode. It would also be conceivable for modulation and monitoring to be carried out on a periodic basis only.

The two-channel principle may also be applied as a means of increasing safety, whereby two or more mutually independent units are involved in transmitting a switch command to the switch 23. This being the case, the motor 5 will only be supplied with the traction voltage if all or at least the majority of these units come to the same decision (switch 23 off or on). In this respect, it is of particular advantage if the units are of different designs or made by different manufacturers. For example, instead of the single decoder 22 illustrated in FIG. 9, two or more decoders could be connected to the switch, in particular by an AND link.

Figure 10:
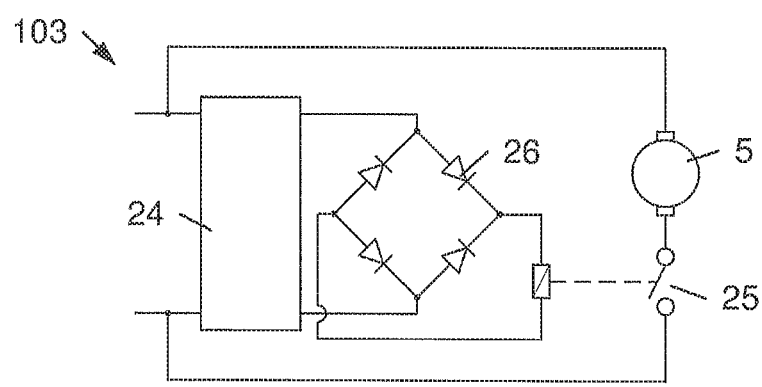

FIG. 10 illustrates an example of a motor controller 103, whereby an alternating voltage component of the traction voltage is coupled out with the aid of a decoupler 24 in the storage and retrieval unit 3 and switched via the rectifier 26 to the control coil of a relay 25 in order to disconnect the traction voltage from traction motor 5. The latter is held in a switched state as a result. In case a), therefore, the alternating component contained in the traction voltage would cause a voltage to be applied to the control coil of the relay 25 and the latter to be held closed. When the alternating component disappears on switching to the risk mode voltage, the relay 25 drops out and the motor 5 is disconnected from the traction voltage. The relay 25 in this case is therefore designed as a closer. In case b), the situation is the reverse, in which case the relay 25 is set up as an opener.

For example, the decoupler 24 could be provided in the form of a transformer and thus couples out the entire alternating component of the traction voltage and directs it via the optional rectifier 26 to the control coil of the relay 25. It would also be conceivable for the decoupler to be provided in the form of a filter, in which case only a specific frequency component is coupled out of the traction voltage. This is of particular advantage in case c), where both the traction voltage and the risk mode voltage contain an alternating component. If the relay 25 is provided as a closer, the filter 24 will be configured for the frequency of the alternating component contained in the traction voltage during normal operation. If, on the other hand, the relay 25 is provided as an opener, the filter 24 will be configured for the frequency of the alternating component contained in the risk mode voltage. Naturally, it would also be possible to use transformers and filters in combination.

Generally speaking, it would also be conceivable for the motor 5 to be switched away from the voltage applied to the storage and retrieval unit 3 below a specific voltage level, especially in the presence of risk mode voltage. The circuit structure illustrated in FIG. 9 may be used for this purpose for example, but a voltage comparator would be provided instead of the decoder 22, for example. If the voltage applied to the storage and retrieval unit 3 drops below the level set on the comparator, the switch 23 will be opened. This makes for increased safety because it means that even unexpected voltage spikes in the risk mode voltage cannot cause the storage and retrieval unit 3 to be powered up and move. This approach is therefore also of advantage if the risk mode voltage is not sufficient per se (as a rule) to cause a movement of the storage and retrieval unit 3. The switch 23 naturally also remains closed in the event of a (co-incidental) rise in the voltage and is not opened again unless an explicit command to this effect is issued, for example by the operator releasing the storage and retrieval unit again once a fault has been cleared. If the multi-channel principle is used as a means of providing even greater safety, two or more comparators may also be involved in the switching process.

The embodiments illustrated as examples represent possible variants of drive control systems 70 . . . 73 and motor controllers 100 . . . 103, and it should be pointed out at this stage that the invention is not specifically limited to the variants specifically illustrated, and these possible variations lie within the reach of the person skilled in this technical field given the disclosed technical teaching.

In particular, the illustrated variants may be used in any combination. For example, the variant illustrated in FIG. 2 may be combined with the variant illustrated in FIG. 5 for the drive control system 70 so that the risk mode voltage is reduced compared with the normal operating voltage and a change signal is additionally modulated onto the traction voltage. It would also be conceivable to combine the variant illustrated in FIG. 3 with the variant illustrated in FIG. 5 so that the risk mode voltage has the opposite polarity of the normal operating voltage and a change signal is also modulated on the traction voltage. Accordingly, the variant illustrated in FIG. 4 could be combined with the variant illustrated in FIG. 9 for the motor controller 100. This provides increased safety when operating the storage and retrieval unit 3.

For the same reason, it would also be conceivable to combine the variant illustrated in FIG. 9 with the variant illustrated in FIG. 10 for the motor controller 100. The decoder 22 could analyze the traction voltage to see if it contains a digital code whilst the decoupler 24 couples only the alternating component caused by the digital signal out of the traction voltage and thus holds the relay 25 open respectively closed. This enables the presence of a risk to be detected in two different ways, which also results in increased safety.

It would naturally also be conceivable to combine all three of the variants illustrated in FIGS. 4, 9 and 10, thereby making operation of the storage and retrieval unit 3 even safer.

Generally speaking, the embodiments are described with reference to a dc motor. This being the case, the traction voltage may have a direct component and optionally an alternating component. However, the invention may naturally also be used without restriction for ac motors and three-phase motors. For example, in this instance the risk mode voltage may be reduced compared with the traction voltage during normal operation or a change signal can be modulated on the traction voltage (see also FIG. 7). At this stage, it should also be pointed out that the power supply rail 6 may comprise several mutually isolated conductors, in particular one each for the positive and negative potential respectively ground (direct voltage) or one each per phase and optionally for zero conductors (alternating voltage).

Furthermore, the storage and retrieval unit 3 is described in the examples as being able to move in only the horizontal direction. However, this is not necessarily the case. The storage and retrieval unit 3 may also move vertically, at an angle and horizontally and vertically. In the latter case, it is provided in the form of a horizontally displaceable lift with a lifting fork.

It should also be noted that the (mechanical) switches 17, 23 and 25 are illustrated in the drawings as being of the same type for reasons of easier understanding but these can be replaced by electronic switches. For example, instead of the switch 18 illustrated in FIG. 9, it would also be possible to use transistors, in particular FETs or IGBTs.

It should also be specifically pointed out that the illustrated controllers and bearing arrangements may in reality comprise more or fewer components than those illustrated and the drawings are but highly simplified representations.

For the sake of good order, finally, it should be noted that in order to provide a clearer understanding of their design, the drive control systems 70 . . . 73, motor controllers 100 . . . 103 and the arrangement in FIG. 1 as well as their constituent parts are illustrated to a certain extent out of scale and/or on an enlarged scale and/or on a reduced scale.

The objective underlying the independent inventive solutions may be found in the description.

LIST OF REFERENCE NUMBERS

1 Rail line
2 Shelf
3 Storage and retrieval unit
4 Wheel
5 Drive motor
6 Power supply rail
70 . . . 73 Drive control system
8 Voltage source/power supply
9 Sliding contact
100 . . . 103 Motor controller
11 Door
12 Switch
13 Photoelectric barrier
14 Push-button switch
15 Protected zone
16 Voltage converter
17 Change-over switch
18 Diode
19 Electronic circuit
20 Modulator
21 Transformer
22 Decoder/demodulator
23 Switch
24 Decoupler
25 Relay
26 Rectifier
U Voltage
t Time

The invention claimed is:

1. Method of operating a storage and retrieval unit (3) which can be moved on a rail line (1) and is supplied by a power supply (8) and/or a power supply rail (6) electrically connected to the rail line (1), by means of which at least one racking row (2) disposed alongside the rail line (1) can be accessed,
wherein
the rail line (1)/power supply rail (6) is set to a risk mode voltage, the rectified value/effective value of which lies below a minimum rectified value/minimum effective value necessary to move the storage and retrieval unit (3) but above zero, if a risk posed by the storage and retrieval unit (3) is detected.

2. Method of operating a storage and retrieval unit (3) which can be moved on a rail line (1) and is supplied by a power supply and/or a power supply rail (6) electrically connected to the rail line (1), by means of which at least one racking row disposed alongside the rail line (1) can be accessed,
wherein
the rail line (1)/power supply rail (6) during normal operation is set to a traction voltage if no risk posed by the storage and retrieval unit (3) is detected by the storage and retrieval unit (3), and is set to a risk mode voltage if a risk posed by the storage and retrieval unit (3) is detected by the storage and retrieval unit (3), and
the voltage applied to the rail line (1)/power supply rail (6) is investigated in the storage and retrieval unit (3) for the presence of a predefined characteristic and said voltage is passed on to a traction motor (5) of the storage and retrieval unit (3) only if the detected characteristic indicates the presence of the traction voltage, and in terms of characteristics
a) the traction voltage contains a predefined first change signal and the risk mode voltage does not contain this first change signal or
b) the risk mode voltage contains a predefined first change signal and the traction voltage does not contain this first change signal or c) the traction voltage contains a predefined first change signal and the risk mode voltage contains a predefined second change signal.

3. Method according to claim 2, wherein the rectified value/effective value of the risk mode voltage lies below a minimum rectified value/minimum effective value necessary to move the storage and retrieval unit (3) but above zero.

4. Method according to claim 1, wherein the maximum value of the risk mode voltage in terms of amount lies below the minimum traction voltage.

5. Method according to claim 1, wherein the risk mode voltage is applied to the rail line (1)/power supply rail (6) with the same polarity as the minimum traction voltage.

6. Method according to claim 1, wherein the risk mode voltage is applied to the rail line (1)/power supply rail (6) with a polarity opposite the polarity of the minimum traction voltage.

7. Method according to claim 1, wherein the risk mode voltage has essentially only a direct component.

8. Method according to claim 1, wherein the risk mode voltage has essentially only an alternating component.

9. Method according to claim 1, wherein the risk mode voltage has a direct component and an alternating component.

10. Method according to claim 2, wherein said change signal is provided in the form of a sinusoidal signal or a digital signal.

11. Method according to claim 2, wherein an alternating voltage in the storage and retrieval unit (3) coupled out of the traction voltage is switched to the control coil of a relay (25) and holds the latter in a switched state, and the relay (25) is configured to disconnect the traction voltage from the traction motor (5).

12. Arrangement, comprising
a rail line (1),
at least one racking row disposed alongside the rail line (1),
a storage and retrieval unit (3) which can be moved on the rail line (1) and
a power supply and/or a power supply rail (6) electrically connected to the rail line (1) which is in contact with the storage and retrieval unit (3),
a drive control system configured to set the rail line (1)/power supply rail (6) to a risk mode voltage, the rectified value/effective value of which lies below a minimum rectified value/minimum effective value necessary to move the storage and retrieval unit (3) but above zero, if a risk posed by the storage and retrieval unit (3) is detected.

13. Arrangement, comprising
a rail line (1),
at least one racking row disposed alongside the rail line (1),
a storage and retrieval unit (3) which can be moved on the rail line (1) and
a power supply and/or a power supply rail (6) electrically connected to the rail line (1) which is in contact with the storage and retrieval unit (3),
a drive control system (70 . . . 73) configured to detect a risk posed by the storage and retrieval unit (3) and set the rail line (1)/power supply rail (6) during normal operation in the absence of a risk to a traction voltage and in the presence of a risk to a risk mode voltage, and
a motor controller (100 . . . 103) in the storage and retrieval unit (3) configured to investigate the voltage applied to the rail line (1)/power supply rail (6) in the storage and retrieval unit (3) for the presence of a predefined characteristic, and said voltage is then passed on to a traction motor (5) of the storage and retrieval unit (3) only if the detected characteristic indicates the presence of the traction voltage, and in terms of characteristics a) the traction voltage contains a predefined first change signal and the risk mode voltage does not contain this first change signal or b) the risk mode voltage contains a predefined first change signal and the traction voltage does not contain this first change signal or c) the traction voltage contains a predefined first change signal and the risk mode voltage contains a predefined second change signal.

* * * * *